(12) United States Patent
Zeng

(10) Patent No.: US 11,132,071 B2
(45) Date of Patent: Sep. 28, 2021

(54) FOLDABLE MOUSE DEVICE

(71) Applicant: Silitek Electronics (Dongguan) Co., Ltd, Guangdong Province (CN)

(72) Inventor: LingSheng Zeng, Guangdong Province (CN)

(73) Assignee: Silitek Electronics (Dongguan) Co., Ltd., Guangdong Province (CN)

( * ) Notice: Subject to any disclaimer, the term of this patent is extended or adjusted under 35 U.S.C. 154(b) by 0 days.

(21) Appl. No.: 16/819,861

(22) Filed: Mar. 16, 2020

(65) Prior Publication Data

US 2020/0379582 A1 Dec. 3, 2020

(30) Foreign Application Priority Data

May 27, 2019 (CN) .......................... 201910447296.4

(51) Int. Cl.
*G06F 3/039* (2013.01)
*G06F 3/0354* (2013.01)

(52) U.S. Cl.
CPC .......... *G06F 3/03543* (2013.01); *G06F 3/039* (2013.01)

(58) Field of Classification Search
CPC .............................. G06F 3/03543; G06F 3/039
See application file for complete search history.

(56) References Cited

U.S. PATENT DOCUMENTS

| 2012/0032884 A1* | 2/2012 | Lee ...................... | G06F 3/03543 345/163 |
| 2014/0168915 A1* | 6/2014 | Wang .................. | H01M 2/1027 361/752 |

* cited by examiner

*Primary Examiner* — Kent W Chang
*Assistant Examiner* — Andrew Lee
(74) *Attorney, Agent, or Firm* — Umberg Zipser LLP; Ryan Dean

(57) ABSTRACT

The present invention disclosed a foldable mouse device comprising a power supply, a flexible connecting sheet, a contacting assembly, a flexible guiding sheet and a controller. The flexible connecting sheet is in contact with the power supply. One end of the contact assembly is connected to the flexible connecting sheet. One end of the flexible guiding sheet is located on one side of the contacting assembly. The controller is respectively connected to the flexible guiding sheet and the power supply. Wherein the flexible guiding sheet is in contact with the contacting assembly when the flexible connecting sheet and the flexible guiding sheet are folded. The flexible connecting sheet and the flexible guiding sheet are used to strengthen the structural strength of the internal circuit for avoiding being damaged or broken arisen from frequent bending and pulling when switching the circuit open and close by folding and unfolding the mouse device.

9 Claims, 12 Drawing Sheets

FOLDABLE MOUSE DEVICE

CROSS REFERENCE TO RELATED APPLICATION

This application claims the priority benefit of Chinese Patent Application Serial Number 201910447296.4, filed on May 27, 2019, the full disclosure of which is incorporated herein by reference.

BACKGROUND

Technical Field

The present invention relates to a mouse device, particularly relates to a folding mouse device achieving ON and OFF by folding.

Related Art

The exterior bulging arc-shaped design of the most of present mouse devices are poor in space utilization for carrying, no matter in a briefcase or a laptop storage bag, thus causing problems on storage. At present, a foldable mouse device is designed in view of the mentioned disadvantage, where the device can be bent into a raised arc shape when it is folded and turned ON and the device can be expanded into a flat shape when it is unfolded and turned OFF. However, by folding and unfolding the device, the frequently bent and pulled wire of internal circuit of the device are easy to be damaged and even broken.

SUMMARY

The embodiments of the present invention provide a foldable mouse device to solve the problems that the wire of the internal circuit of the foldable mouse is easy to be damaged by bending in the prior art.

The present invention provides a foldable mouse device comprising a power supply, a flexible connecting sheet, a contacting assembly, a flexible guiding sheet and a controller. The flexible connecting sheet is connected to the power supply, one end of the contacting assembly is in contact with the flexible connecting sheet, one end of the flexible guiding sheet is located at one side of the contacting assembly, and the controller is connected to the flexible guiding sheet and the power supply respectively, wherein the flexible guiding sheet is in contact with the contacting assembly when the flexible connecting sheet and the flexible guiding sheet are folded.

In the present invention, the internal circuit of the foldable mouse device's bending part uses the flexible connecting sheet and the flexible guiding sheet as electrical conducting parts. Since the strength of the flexible connecting sheet and the flexible guiding sheet is higher than that of the wire, it is possible to avoid the internal circuit wire damage caused by frequent bending or stretching in the state of being bent and unfolded of the foldable mouse device. Moreover, both the flexible connecting sheet and the flexible guiding sheet conduct electricity only through contact, so they are less likely to be subjected to an external force (such as pulling), thereby preventing structural damage.

It should be understood, however, that this summary may not contain all aspects and embodiments of the present invention, that this summary is not meant to be limiting or restrictive in any manner, and that the invention as disclosed herein will be understood by one of ordinary skill in the art to encompass obvious improvements and modifications thereto.

BRIEF DESCRIPTION OF THE DRAWINGS

The features of the exemplary embodiments believed to be novel and the elements and/or the steps characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION OF THE EMBODIMENTS

Figure 1:
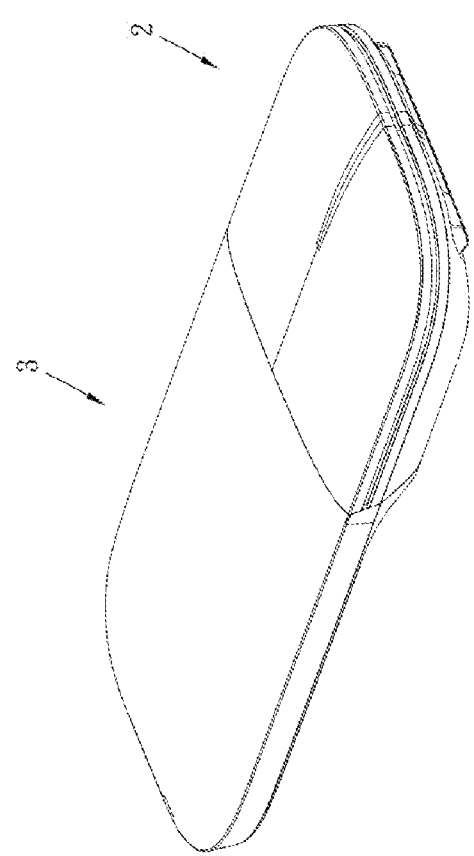
FIG. 1 is an expanded schematic view of the foldable mouse device of the present invention.

The present invention will now be described more fully hereinafter with reference to the accompanying drawings, in which exemplary embodiments of the invention are shown. This present invention may, however, be embodied in many different forms and should not be construed as limited to the embodiments set forth herein. Rather, these embodiments are provided so that this present invention will be thorough and complete, and will fully convey the scope of the present invention to those skilled in the art.

Certain terms are used throughout the description and following claims to refer to particular components. As one skilled in the art will appreciate, manufacturers may refer to a component by different names. This document does not intend to distinguish between components that differ in name but function. In the following description and in the claims, the terms "include/including" and "comprise/comprising" are used in an open-ended fashion, and thus should be interpreted as "including but not limited to". "Substantial/substantially" means, within an acceptable error range, the person skilled in the art may solve the technical problem in a certain error range to achieve the basic technical effect.

The following description is of the best-contemplated mode of carrying out the invention. This description is made for the purpose of illustration of the general principles of the invention and should not be taken in a limiting sense. The scope of the invention is best determined by reference to the appended claims.

Moreover, the terms "include", "contain", and any variation thereof are intended to cover a non-exclusive inclusion. Therefore, a process, method, object, or device that includes a series of elements not only includes these elements, but also includes other elements not specified expressly, or may include inherent elements of the process, method, object, or device. If no more limitations are made, an element limited by "include a/an . . . " does not exclude other same elements existing in the process, the method, the article, or the device which includes the element.

In the following embodiment, the same reference numerals are used to refer to the same or similar elements throughout the invention.

FIG. 1 to FIG. 5 are showing an expanded schematic view, an expanded schematic view of the internal arrangement, another expanded schematic view of the internal arrangement, an enlarged view of an A area, and an expanded side schematic view of the internal arrangement of a foldable mouse device according to an embodiment of the present invention. As shown in the figures of the embodiment, a foldable mouse device 1 is provided. By reinforcing the structural strength of the internal circuit of the foldable mouse device 1, the structural strength of the internal circuit would not be easily damaged due to frequent bending and pulling when switching the circuit open and close by folding and unfolding the mouse device.

The foldable mouse device 1 in the present invention comprises a control part 2 and a bending part 3, where the control part 2 is installed with a power supply 21 and a controller 23 and the bending part 3 is installed with a flexible connecting sheet 31, a contacting assembly 33 and a flexible guiding sheet 35. The flexible connecting sheet 31 includes a first end 311 and a second end 312, and the first end 311 of the flexible connecting sheet 31 is electrically connected to the power supply 21. The second end 312 of the flexible connecting sheet 31 is away from the control part 2, and the direction from the control part 2 toward the bending part 3 is the extending direction of the flexible connecting sheet 31. The contacting assembly 33 is installed beneath the flexible connecting sheet 31, and one end of the contacting assembly 33 is in contact with the flexible connecting sheet 31. The flexible guiding sheet 35 is installed beneath the flexible connecting sheet 31 and spaced apart from the flexible connecting sheet 31. The flexible guiding sheet 35 also comprises a first end 351 and a second end 352, where the first end 351 of the flexible guiding sheet 35 corresponds to the first end 311 of the flexible connecting sheet 31, and the second end 352 of the flexible guiding sheet 35 corresponds to the second end 312 of the flexible connecting sheet 31. The second end 352 of the flexible guiding sheet 35 is located on one side of the contacting assembly 33. The controller 23 is simultaneously connected to the first end 351 of the flexible guiding sheet 35 and the power supply 21.

Figure 6:
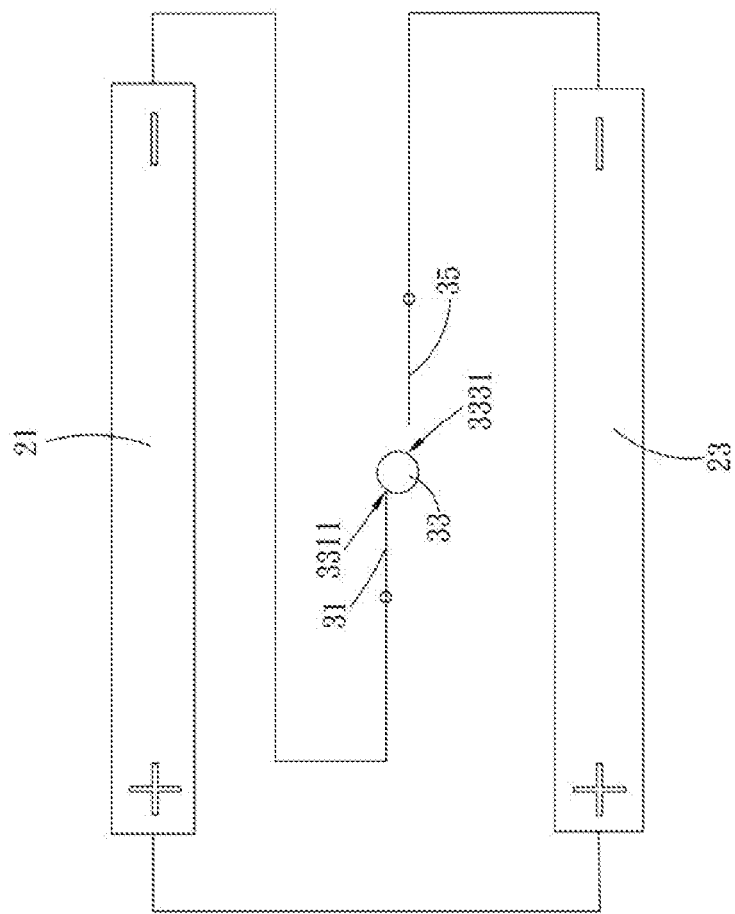
FIG. 6 is a schematic diagram of the internal circuit of the foldable mouse of the present invention.
Figure 7:
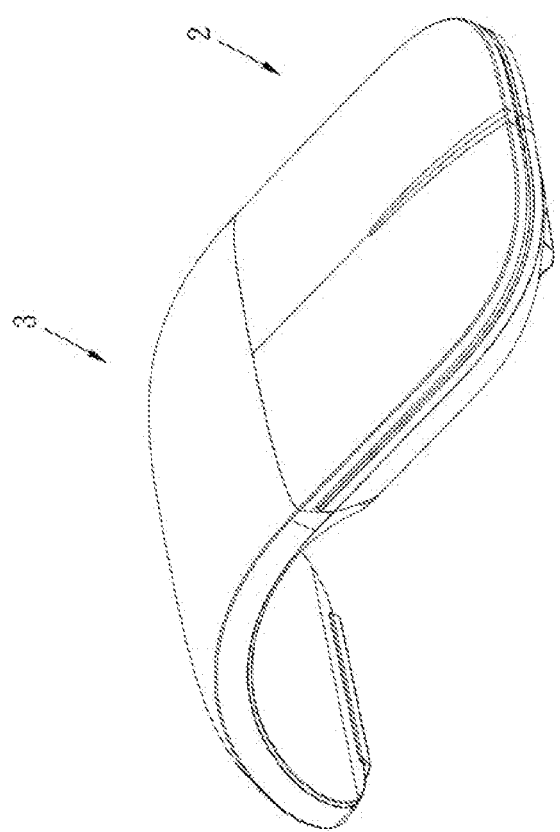
FIG. 7 is a folded schematic view of the foldable mouse device of the present invention.

As shown in FIG. 6, a schematic diagram of the internal circuit of the foldable mouse device 1 of one embodiment in the present invention, the power supply 21 comprises an anode and a cathode, where the anode of the power supply 21 is connected to the controller 23 and the cathode of the power supply 21 is connected to the flexible connecting sheet 31, respectively. In this embodiment, the controller 23 also comprises an anode and a cathode, where the flexible connecting sheet 31 is electrically connected to the cathode of the power supply 21, the flexible guiding sheet 35 is electrically connected to the cathode of the controller 23, and the anode of the controller 23 is electrically connected to the anode of the power supply 21. The controller 23 is configured to receive operational signals of the foldable mouse device 1 such as movements, left clicks, right clicks, scrolling and etc. The power supply 21 can be a battery or a secondary battery.

Figure 8:
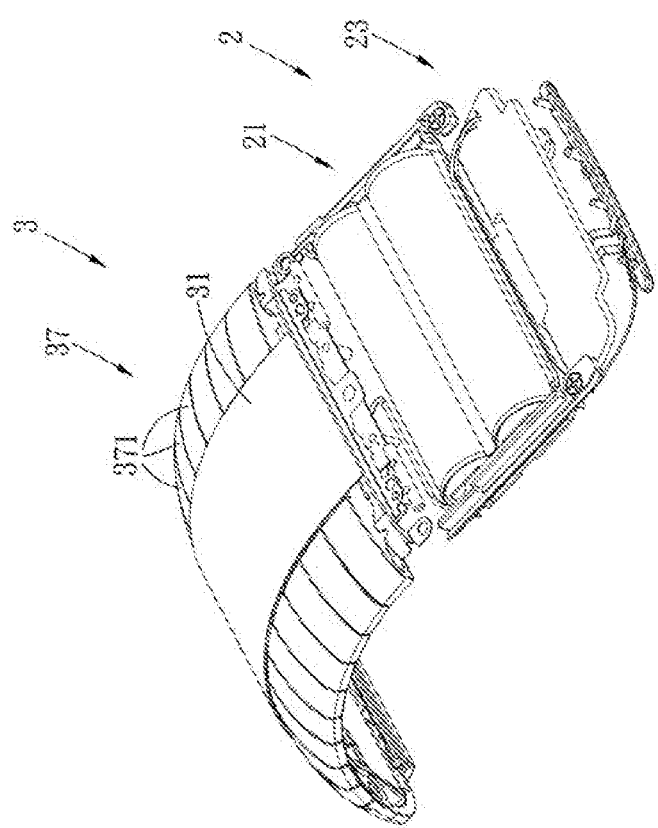
FIG. 8 is a folded schematic view of the internal arrangement of the foldable mouse device of the present invention.
Figure 9:
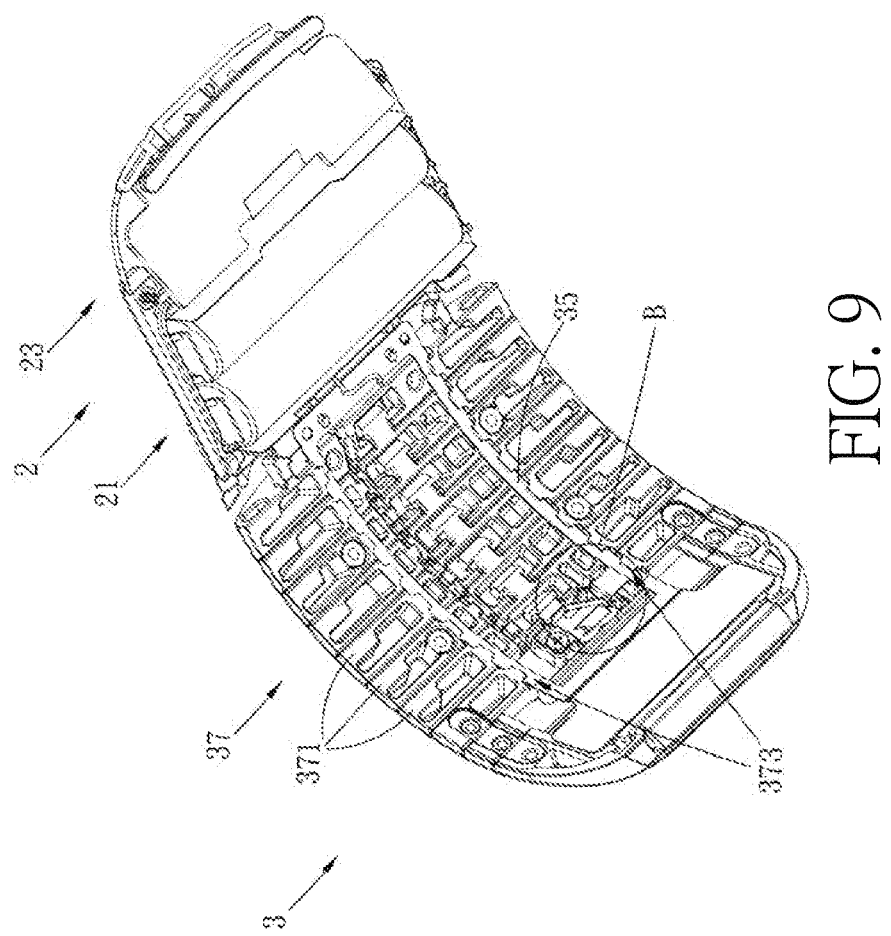
FIG. 9 is another folded schematic view of the internal arrangement of the foldable mouse device of the present invention.
Figure 10:
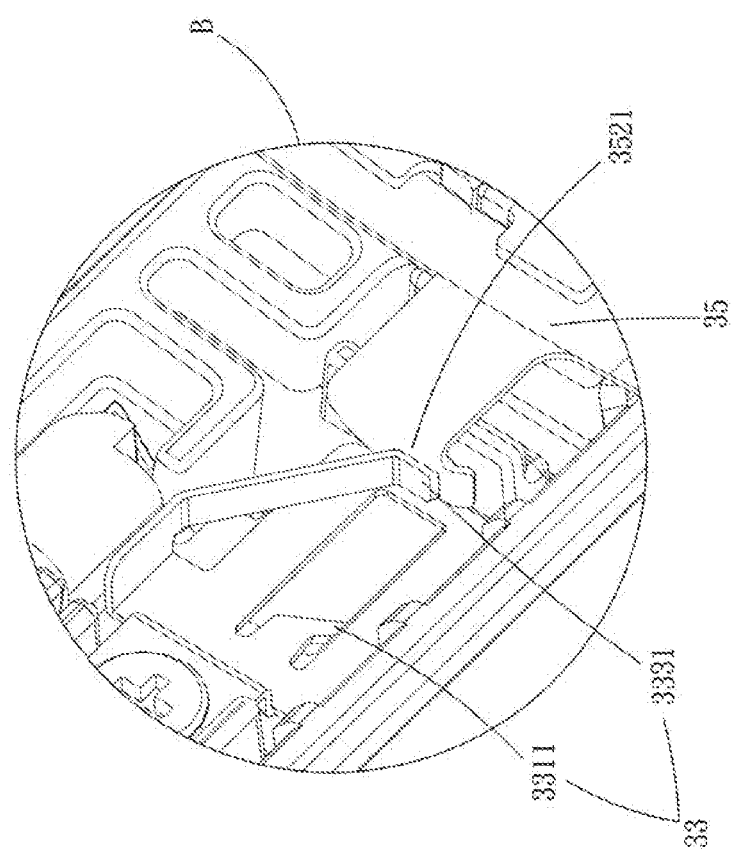
FIG. 10 is an enlarged view of area B in FIG. 9.
Figure 11:
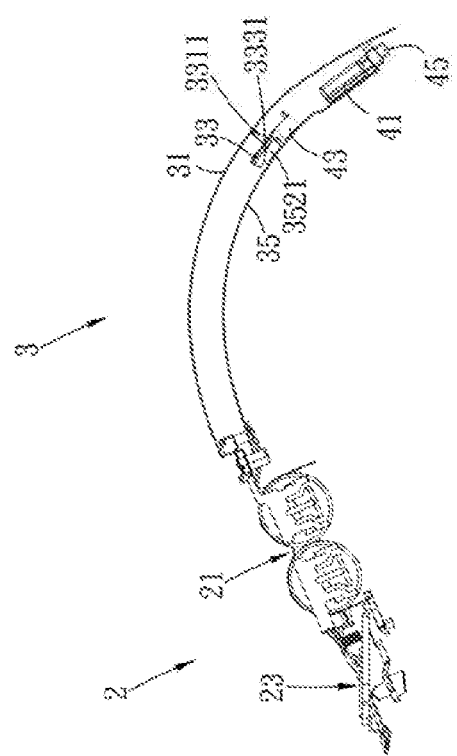
FIG. 11 is a folded side schematic view of the internal arrangement of the foldable mouse device of the present invention.

In this embodiment, when the bending part 3 of the foldable mouse device 1 is unfolded, the contacting assembly 33 is not in contact with the second end 352 of the flexible guiding sheet 35. At this time, the circuit in between the power supply 21, the flexible connecting sheet 31, the contacting assembly 33, the flexible guiding sheet 35 and the controller 23 are opened, so that the power supply 21 cannot apply power to the controller 23 to activate the foldable mouse device 1. At this time, the foldable mouse device 1 is in the OFF status. On the contrary, when the bending part 3 of the foldable mouse device 1 is bent, the flexible connecting sheet 31 and the flexible guiding sheet 35 are bent (as shown in FIG.8 and FIG.9), and the second end 352 of the flexible guiding sheet 35 is in contact with the contacting assembly 33. At this time, the circuit in between the power supply 21, the flexible connecting sheet 31, the contacting assembly 33, the flexible guiding sheet 35 and the controller 23 are closed, so that the power supply 21 applies power to the controller 23 through the way said above to activate the foldable mouse device 1. At this time, the foldable mouse device 1 is in the ON status.

Figure 5:
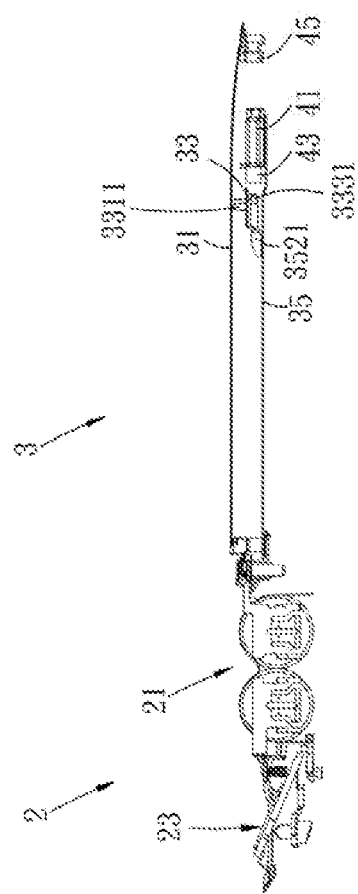
FIG. 5 is an expanded side schematic view showing the internal arrangement of the foldable mouse device of the present invention.

Refer to FIG.5 of the embodiment, the contacting assembly 33 comprises a first contact switch having a first contact part 3311 and a second contact part 3331, where the first contact part 3311 is in contact with the flexible connecting sheet 31 and the second contact part 3331 is located at on side of the flexible guiding sheet 35. The second end 352 of the flexible guiding sheet 35 has a guiding part 3521 relative to the second contact part 3331. When the bending part 3 of the foldable mouse device 1 is unfolded, the second contact part 3331 of the contacting assembly 33 is not in contact with the flexible guiding sheet 35. On the contrary, when the bending part 3 of the foldable mouse device 1 is bent, the second contact part 3331 of the contacting assembly 33 is in contact with the guiding part 3521 of the flexible guiding sheet 35, so that the circuit in between the power supply 21, the flexible connecting sheet 31, the contacting assembly 33, the flexible guiding sheet 35 and the controller 23 are closed.

Figure 2:
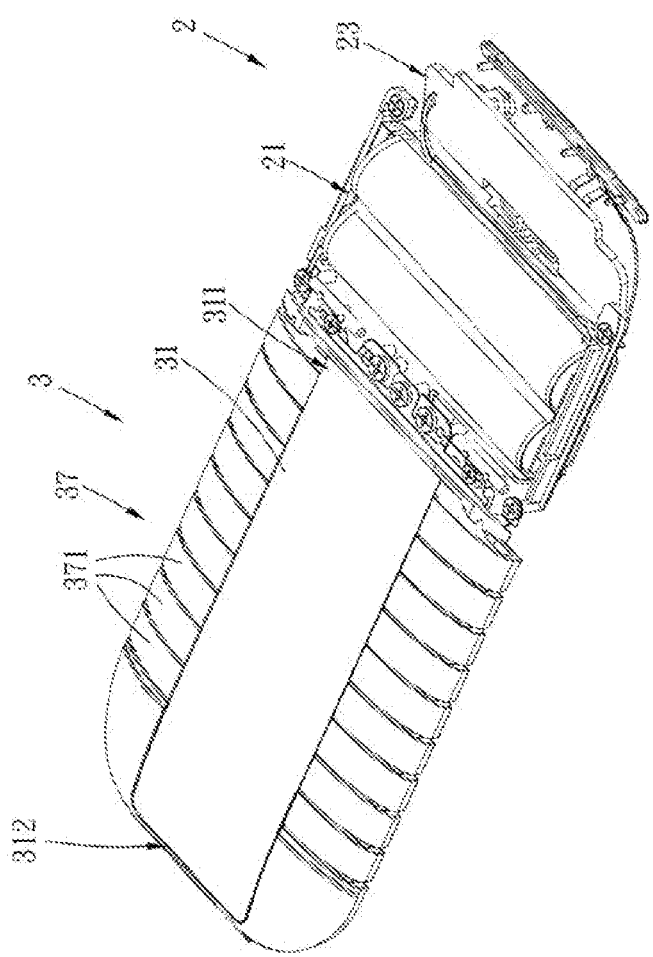
FIG. 2 is an expanded schematic view showing the internal arrangement of the foldable mouse device of the present invention.
Figure 3:
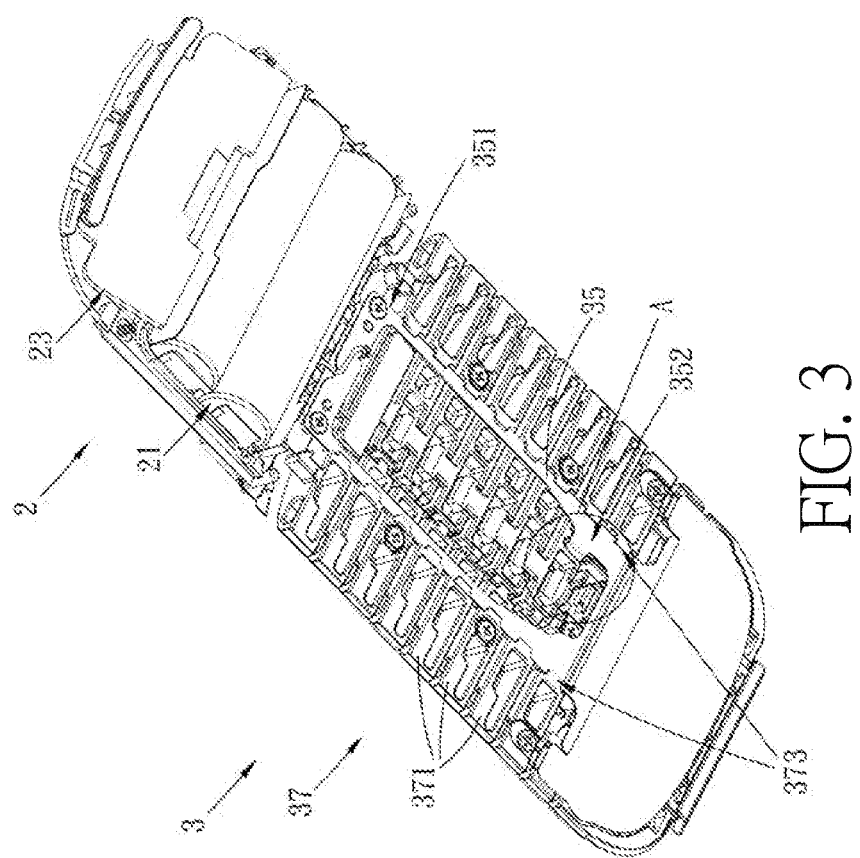
FIG. 3 is another expanded schematic view showing the internal arrangement of the foldable mouse device of the present invention.
Figure 4:
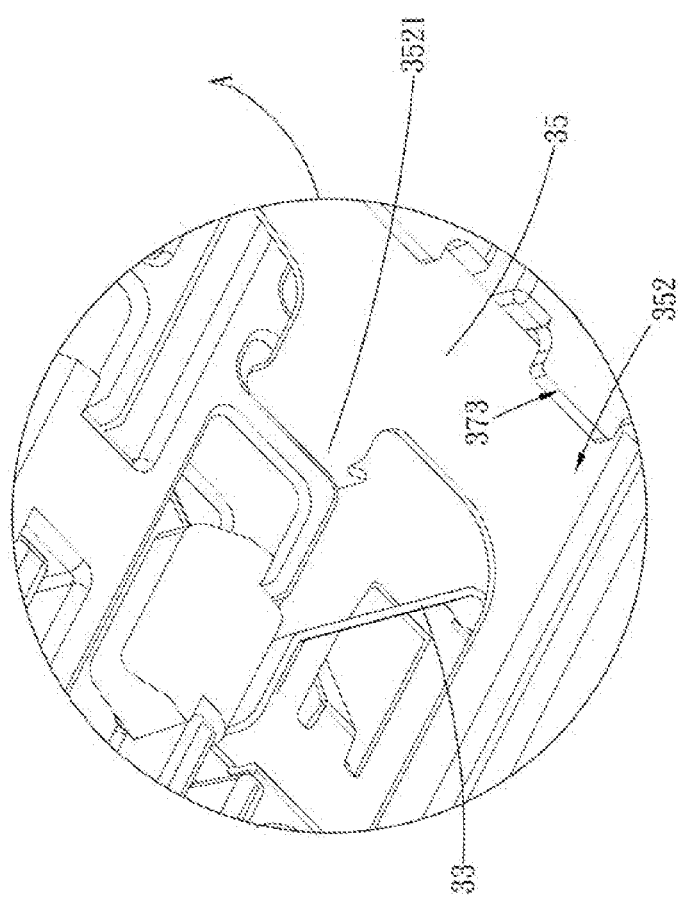
FIG. 4 is an enlarged view of the area A in FIG. 3.

Refer to FIG.2 to FIG.4 of the embodiment, the bending part 3 of the foldable mouse device 1 further comprises a bendable body 37 having a plurality of series-connected bent components 371 making the bendable body 37 bendable and retaining the bending status of the bendable body 37 after the bendable body 37 has been bent. On the other hand, the bendable body 37 can be returned to flat and can be retained in the same status from bent status. The flexible connecting sheet 31 is installed above the bendable body 37. The contacting assembly 33 is installed on the bottom of the bendable body 37, and one end of the contacting assembly 33 passes through the bendable body 37 to be in contact with the flexible connecting sheet 31. The flexible guiding sheet 35 is installed at the bottom of the bendable body 37 and is opposed to the flexible connecting sheet 31. The bottom of the bendable body 37 comprises two restraining parts 373, and the two restraining parts 373 are located on both sides of the bottom of the bendable body 37, the flexible guiding sheet 35 is located between the two restraining parts 373 which means the two sides of the flexible guiding sheet 35 are operatively restrained by the restraining parts 373. The second end 352 of the flexible guiding sheet 35 is defined as an active end which is not restrained by the restraining parts 373 and is spaced apart from the contacting assembly 33 by a distance.

FIG. 7 to FIG. 11 are showing a folded schematic view, a folded schematic view of the internal arrangement, another folded schematic view of the internal arrangement, an enlarged view of B area, and a folded side schematic view of the internal arrangement of a foldable mouse device according to an embodiment of the present invention. As shown in the figures of the embodiment, the circuit is switched to be opened and closed by folding and unfolding the foldable mouse device 1, thereby achieving the function of switch. After the bendable body 37 is bent, the flexible connecting sheet 31 is located at the outer side of the bend of the bendable body 37 and the flexible guiding sheet 35 is located at the inner side of the bend of the bendable body 37. Since the flexible connecting sheet 31 is deformed in accordance with the bending of the bendable body 37, the bendable body 37 is bent and forced to be pressed inward so the gap between the plurality of bent components 371 will be extruded. In other words, the plurality of bent components 371 of the bendable body 37 close to the flexible guiding sheet 35 are pressed inward, and the inner gap of the plurality of bent components 371 is reduced. At the same time, the plurality of bent components 371 of the bendable body 37 adjacent to the flexible connecting sheet 31 is expanded outward, and the outer gap of the plurality of bent components 371 becomes larger.

The flexible guiding sheet 35 located inside the bendable body 37 can also be extruded by the bending of the bendable body 37, and the flexible guiding sheet 35 is deformed along with the bending of the restraining parts 373 on both sides of the bendable body 37. Since the first end 351 of the flexible guiding sheet 35 is fixed to the bendable body 37 and the second end 352 of the flexible guiding sheet 35 is not fixed, the space, which is forced to be extruded inward by the bend of the flexible guiding sheet 35, moves along the parallel direction of the restraining parts 373, that is, towards the second end 352 of the flexible guiding sheet 35. In addition, the flexible connecting sheet 31 and the flexible guiding sheet 35 may be made of a metal material with ductility, such as copper, silver or stainless steel, to facilitate bending or flattening of the shape of the flexible connecting sheet 31 and the flexible guiding sheet 35. Therefore, the guiding part 3521 of the second end 352 of the flexible guiding sheet 35 is moved and touches the second contacting part 3331 of the contacting assembly 33, so that the circuit in between power supply 21, the flexible connecting sheet 31, the contacting assembly 33, the flexible guiding sheet 35 and the controller 23 are closed. The folded state of the foldable mouse device 1 is retained by the plurality of bent components 371 of the bendable body 37. At this time, the foldable mouse device 1 is in the ON status.

On the contrary, when the bendable body 37 is restored to flat, the flexible guiding sheet 35 is not in contact with the contacting assembly 33 forming an open circuit, so the orientation of other parts is restored to the status before bending. Therefore, the related matter will not be described again. In addition, the flattened state of the foldable mouse device 1 is retained by the plurality of bent components 371 of the bendable body 37. At this time, the foldable mouse device 1 is in the OFF status.

Furthermore, refer to FIG.5 to FIG.11 of the embodiment, the foldable mouse device 1 further comprises a magnetic body 41, a first magnetic part 43 and a second magnetic part 45. One end of the flexible guiding sheet 35 is fixed to the bendable body 37, and the other end of the flexible guiding sheet 35 has a magnetic body 41, such as a magnet, and is movably connected to the bendable body 37. The bendable body 37 includes a first magnetic part 43 and a second magnetic part 45. The first magnetic part 43 is installed relative to the second magnetic part 45. The magnetic body 41 is located between the first magnetic part 43 and the second magnetic part 45. It also means that the magnetic body 41 moves between the first magnetic part 43 and the second magnetic part 45 along with the bending of the flexible guiding sheet 35.

When the foldable mouse device 1 is flattened, the magnetic body 41 is attracted to the first magnetic part 43 and is being retained flattened. When the foldable mouse device 1 starts to bend, the flexible guiding sheet 35 drives the magnetic body 41 to move in the direction toward the second magnetic part 45, that is, the magnetic body 41 is being away from the first magnetic part 43, and the magnetic body 41 is attracted to the second magnetic part 45, to retain the foldable mouse device 1 in a bent state. As a result, whether the foldable mouse device 1 is flattened or bent, the foldable mouse device 1 can stably stay flattened or bent through the attraction between the magnetic body 41 and the first magnetic part 43 or the second magnetic part 45.

Figure 12:
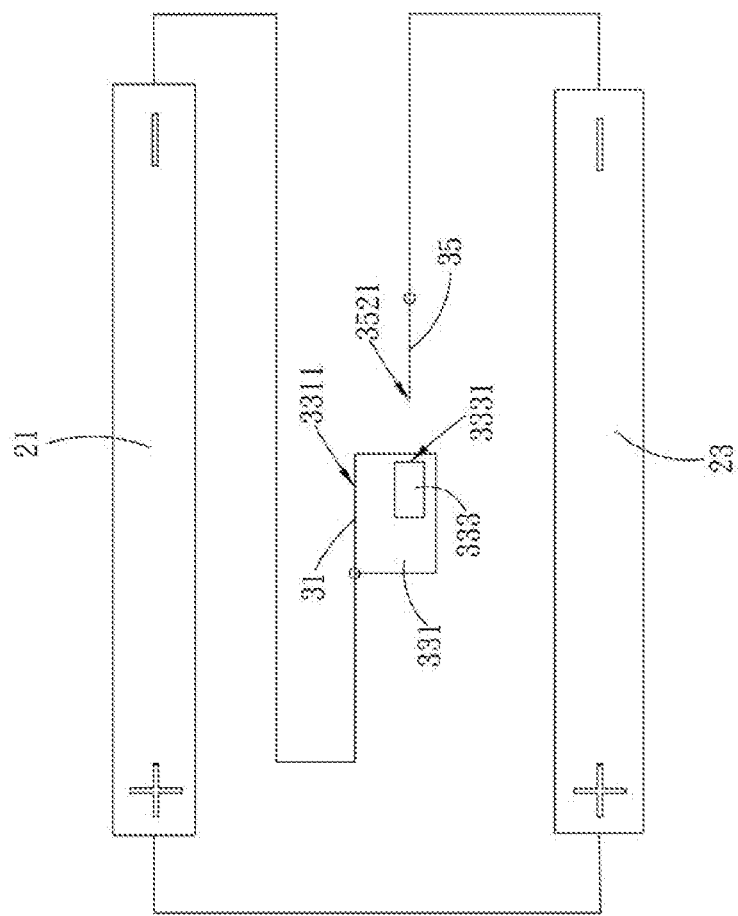
FIG. 12 is another schematic diagram of the internal circuit of the foldable mouse device of the present invention.

As shown in FIG. 12, a schematic diagram of another internal circuit of the foldable mouse device 1 of one embodiment in the present invention, another contacting assembly 33 is provided. The contacting assembly 33 further includes a power board 331 and a second contact switch 333. The second contact switch 333 is installed on the power board 331. The power board 331 has a first contact part 3311. The first contact part 3311 is in contact with a flexible connecting sheet 31, that is, the power board 331 and the flexible connecting sheet 31 are electrically connected. The second contact switch 333 has a second contact part 3331, and the second contact part 3331 is located on one side of the flexible guiding sheet 35. The flexible guiding sheet 35 has a guiding part 3521 with respect to the second contact portion 3331. In the embodiment of the present invention, the contact and separation of the guiding part 3521 and the second contact portion 3331 are used to control the close and open of the second contact switch 333, thereby achieving the activation and deactivation of the foldable mouse device 1. The manner of carrying out the contact and separation between the guiding part 3521 and the second contact portion 3331 is identical to that of the foregoing embodiment, so details of which will not be described herein again.

In summary, the present invention proposed a foldable mouse device to achieve activation and deactivation by connecting flexible connecting sheet with power supply and flexible guiding sheet with the controller, respectively. The plated type flexible connecting sheet and the flexible guiding sheet are highly structural strengthened, thus the flexible connecting sheet and the flexible guiding sheet cannot be easily damaged by frequent bending, thereby the reliability and the service life of the foldable mouse device is improved.

It is to be understood that the term "comprises", "comprising", or any other variants thereof, is intended to encompass a non-exclusive inclusion, such that a process, method, article, or device of a series of elements not only include those elements but also includes other elements that are not explicitly listed, or elements that are inherent to such a process, method, article, or device. An element defined by the phrase "comprising a . . ." does not exclude the presence of the same element in the process, method, article, or device that comprises the element.

Although the present invention has been explained in relation to its preferred embodiment, it does not intend to limit the present invention. It will be apparent to those skilled in the art having regard to this present invention that other modifications of the exemplary embodiments beyond those embodiments specifically described here may be made without departing from the spirit of the invention. Accordingly, such modifications are considered within the scope of the invention as limited solely by the appended claims.

What is claimed is:

1. A foldable mouse device, comprising:
   a power supply;
   a flexible connecting sheet connected to the power supply;
   a contacting assembly, one end of which is in contact with the flexible connecting sheet;
   a flexible guiding sheet, one end of which is located at one side of the contacting assembly;
   a controller connected to the flexible guiding sheet and the power supply respectively;
   a bendable body;
   wherein the flexible guiding sheet is in contact with the contacting assembly when the flexible connecting sheet and the flexible guiding sheet are folded, and wherein the flexible connecting sheet is installed above the bendable body;
   the contacting assembly is installed on bottom of the bendable body;
   one end of the conctacting assembly passes through the bendable body to be in contact with the flexible connecting sheet;
   the flexible guiding sheet is installed at the bottom of the bendable body; and
   the end of the flexible guiding sheet close to the contacting assembly is spaced apart from the contacting assembly by a distance.

2. The foldable mouse device according to claim 1, wherein the power supply comprises an anode and a cathode; the anode is connected to the controller and the cathode is connected to the flexible connecting sheet, respectively.

3. The foldable mouse device according to claim 1, wherein the contacting assembly comprises a first contact switch having a first contact part and a second contact part; the flexible guiding sheet comprises a guiding part; the first contact part is in contact with the flexible connecting sheet; the second contact part is located at one side of the guiding part.

4. The foldable mouse device according to claim 1, wherein the contacting assembly comprises a power board and a second contact switch; the power board comprises a first contact part; the second contact switch comprises a second contact part; the flexible guiding sheet comprises a guiding part; the first contact part is in contact with the flexible connecting sheet; the second contact part is located at one side of the guiding part.

5. The foldable mouse device according to claim 1, wherein the bendable body comprises a plurality of bent components connected in series, and the bendable body is bent by the plurality of the bent components.

6. The foldable mouse device according to claim 5, wherein after the bendable body is bent, the plurality of the bent components of the bendable body adjacent to the flexible guiding sheet is extruded inward, the inner gap of the plurality of the bent components is reduced, the plurality of the bent components of the bendable body adjacent to the flexible connecting sheet is expanded outward, and the outer gap of the plurality of the bent components becomes larger.

7. The foldable mouse device according to claim 1, wherein the bottom of the bendable body comprises two restraining parts, and the two restraining parts are located on both sides of the bottom of the bendable body, the flexible guiding sheet is located between the two restraining parts.

8. The foldable mouse device according to claim 7, wherein the contacting assembly is located between the two restraining parts.

9. The foldable mouse device according to claim 1, wherein one end of the flexible guiding sheet is fixed to the bendable body; the other end of the flexible guiding sheet comprises a magnetic body; the bendable body comprises a first magnetic part and a second magnetic part; the magnetic body is located between the first magnetic part and the second magnetic part.

* * * * *